United States Patent
Nagai et al.

(10) Patent No.: US 8,855,167 B2
(45) Date of Patent: Oct. 7, 2014

(54) GAS DISCHARGE CHAMBER

(71) Applicant: Gigaphoton Inc., Tokyo (JP)

(72) Inventors: Shinji Nagai, Hiratsuka (JP); Fumika Yoshida, Hiratsuka (JP); Osamu Wakabayashi, Hiratsuka (JP); Kouji Kakizaki, Hiratsuka (JP)

(73) Assignee: Gigaphoton Inc., Tokyo (JP)

( * ) Notice: Subject to any disclaimer, the term of this patent is extended or adjusted under 35 U.S.C. 154(b) by 0 days.

(21) Appl. No.: 13/931,840

(22) Filed: Jun. 29, 2013

(65) Prior Publication Data

US 2013/0322483 A1 Dec. 5, 2013

Related U.S. Application Data

(63) Continuation of application No. 12/899,886, filed on Oct. 7, 2010, now Pat. No. 8,503,499, and a continuation of application No. PCT/JP2009/057064, filed on Apr. 6, 2009.

(30) Foreign Application Priority Data

Apr. 7, 2008 (JP) ................................. 2008-098889

(51) Int. Cl.
*H01S 3/08* (2006.01)
*G02B 5/30* (2006.01)
*G02B 1/02* (2006.01)
*H01S 3/034* (2006.01)
*H01S 3/081* (2006.01)
*H01S 3/225* (2006.01)

(52) U.S. Cl.
CPC ............... *H01S 3/034* (2013.01); *H01S 3/0816* (2013.01); *G02B 5/3091* (2013.01); *G02B 1/02* (2013.01); *H01S 3/225* (2013.01); *H01S 3/08054* (2013.01); *H01S 3/2251* (2013.01); *H01S 3/0346* (2013.01)
USPC ............... 372/105; 372/103; 372/99; 372/57; 372/55

(58) Field of Classification Search
USPC .................................. 372/105, 103, 99, 57, 55
See application file for complete search history.

(56) References Cited

U.S. PATENT DOCUMENTS 8,503,499 B2 * 8/2013 Nagai et al. ..................... 372/55
2003/0219056 A1 11/2003 Yager
(Continued)

FOREIGN PATENT DOCUMENTS

JP 2006-73921 A1 3/2006
JP 2006-165484 A 6/2006

OTHER PUBLICATIONS

International Search Report dated Jun. 24, 2009 for International Application No. PCT/JP2009/057064.

(Continued)

*Primary Examiner* — Kinam Park
(74) *Attorney, Agent, or Firm* — Kratz, Quintos & Hanson, LLP

(57) ABSTRACT

A gas discharge chamber that uses a calcium fluoride crystal which reduces a breakage due to mechanical stress (window holder and laser gas pressure), thermal stress from light absorption, and the like, increases the degree of linear polarization of output laser, and suppresses degradation due to strong ultraviolet (ArF, in particular) laser light irradiation. A first window (2) and a second window (3) of the gas discharge chamber have an incident plane and an emitting plane in parallel with a (111) crystal plane of their calcium fluoride crystal. With respect to an arrangement where laser light entering the calcium fluoride crystal passes through a plane including a <111> axis and a <001> axis of each of the first window (2) and the second window (3) as seen from inside the chamber (1), the first window (2) and the second window (3) are arranged in positions rotated in the same direction by the same angle about their <111> axis.

1 Claim, 21 Drawing Sheets

(56) References Cited

U.S. PATENT DOCUMENTS

2003/0231687 A1    12/2003    Wakabayashi et al.
2007/0297483 A1    12/2007    Wakabayashi et al.
2008/0094701 A1*    4/2008    Natura et al. ............... 359/483

OTHER PUBLICATIONS

Denis G. Flagello, Steve Hansen, Bernd Geh, Michael Totzeck, "Challenges with Hyper-NA(NA>1.0)Polarized Light Lithography for Sub $\lambda/4$ resolution" Proceedings of SPIE Vo.5754(2005)p. 53-68.

* cited by examiner

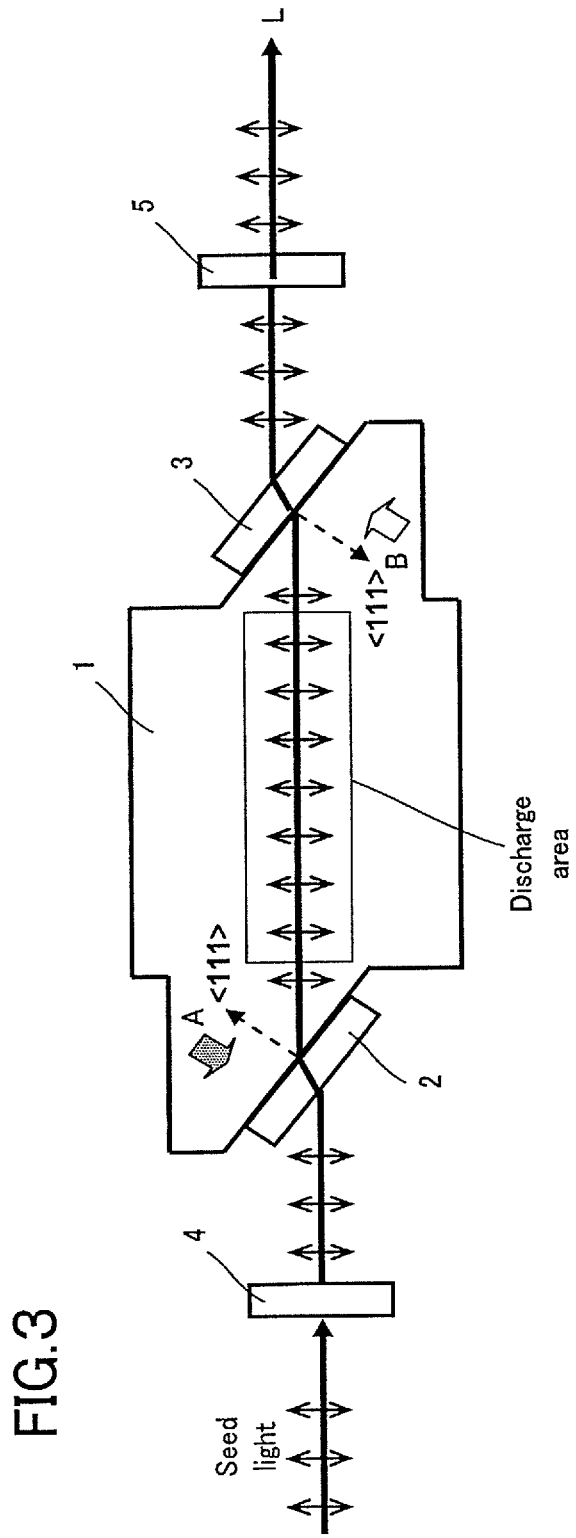

FIG.4A
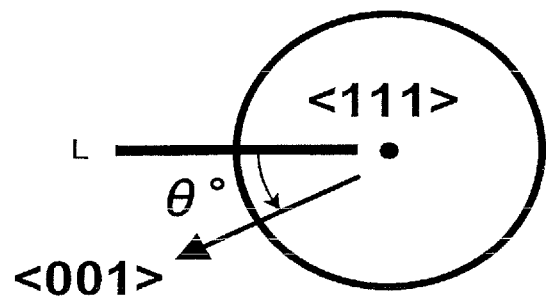
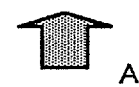
FIG.4B
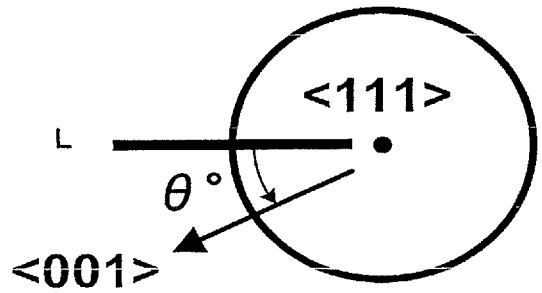

FIG.23A
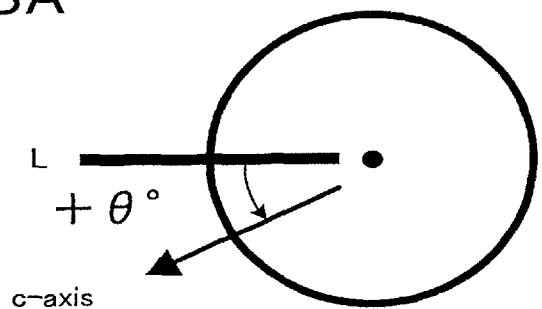
FIG.23B
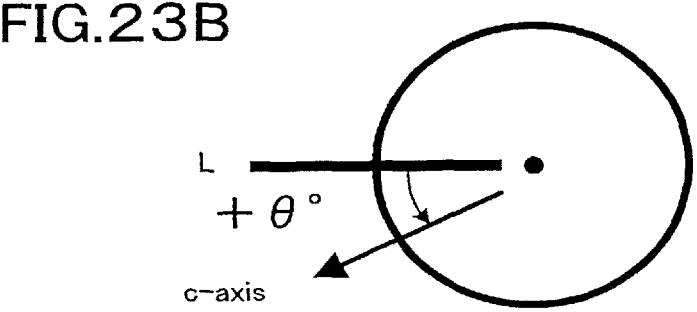

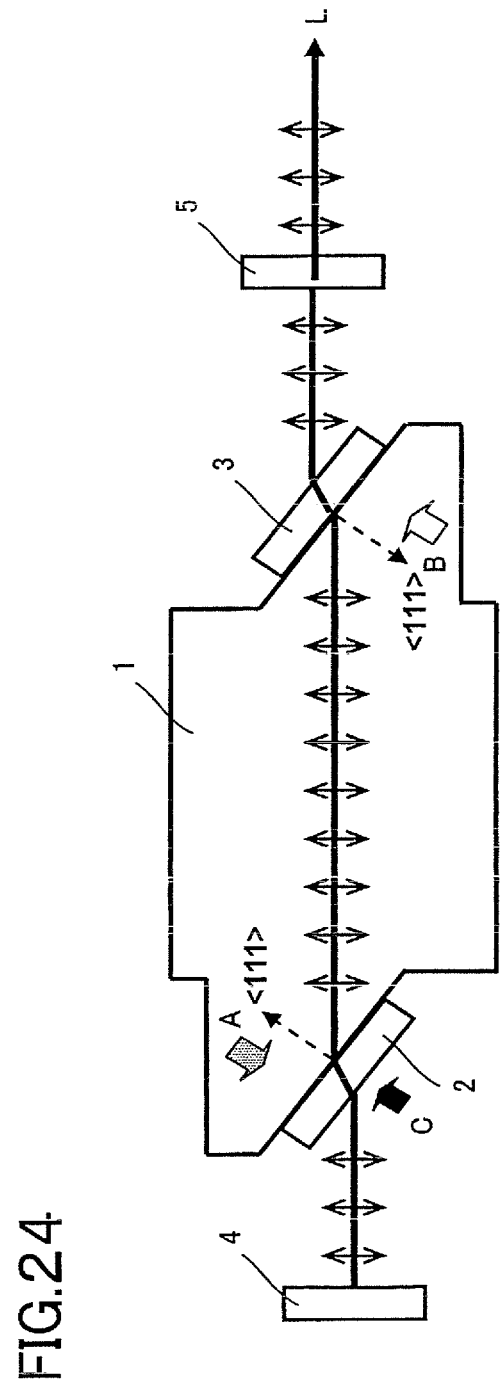

FIG.25A
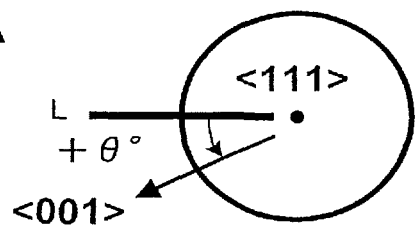
 A
FIG.25B
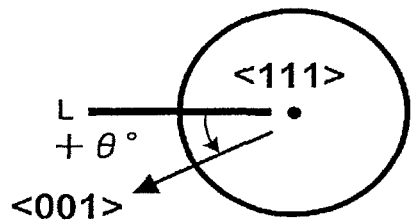
 B
FIG.25C
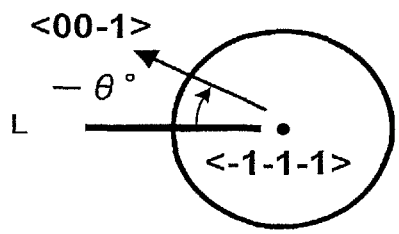
 C FIG.27A
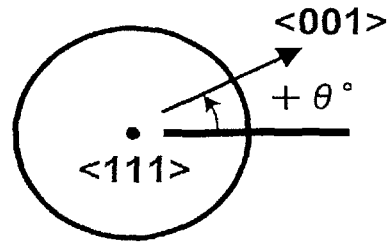
 A
FIG.27B
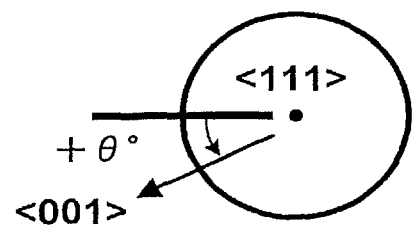
 B
FIG.27C
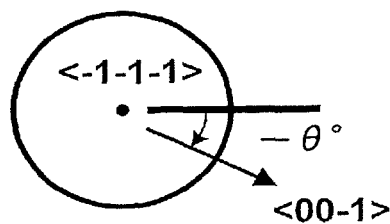
 C

GAS DISCHARGE CHAMBER

CROSS-REFERENCE TO RELATED APPLICATIONS

This application is a Continuation application of Ser. No. 12/899,886 filed on Oct. 7, 2010, which is a Continuation Application of International Application No. PCT/JP2009/057064 filed on Apr. 6, 2009, which is based upon and claims the benefit of priority from the prior Japanese Patent Application No. 2008-098889, filed on Apr. 7, 2008, the entire contents of each of which are incorporated herein by reference.

TECHNOLOGICAL FIELD

The present invention relates to a gas discharge chamber, and more particularly to a vacuum ultraviolet laser device for use in a semiconductor exposure apparatus, such as an excimer laser and a fluorine molecular laser.

BACKGROUND (Exposure Light Source)

With the miniaturization and higher integration of semiconductor integrated circuits, improved resolution has been desired of semiconductor exposure apparatuses. This entails a reduction in the wavelength of light emitted from the exposure light source, and a gas laser device has been replacing a conventional mercury lamp as the exposure light source. The exposure gas laser devices currently in use include a KrF excimer laser device which emits deep ultraviolet light of 248 nm in wavelength, and an ArF excimer laser device which emits vacuum ultraviolet light of 193 nm in wavelength. As a next-generation exposure technology, the application of immersion technology to ArF excimer laser exposure is under review. The immersion technology is to fill the gap between the exposure lens and the wafer with a liquid to modify the refractive index, thereby reducing the apparent wavelength of the exposure light source. The ArF excimer laser immersion provides a wavelength of 134 nm when the immersion liquid is pure water. As an exposure light source of a more advanced generation, $F_2$ (molecular fluorine) laser immersion exposure using an $F_2$ laser device may be able to be employed which emits vacuum ultraviolet light of 157 nm in wavelength. The $F_2$ laser immersion is to provide a wavelength of 115 nm.

(Exposure Optical Element and Chromatic Aberration)

Semiconductor exposure apparatuses often use a projection optical system. In the projection optical system, lenses and other optical elements having different refractive indices are combined for chromatic aberration correction. The current exposure light sources have laser wavelengths in the wavelength (ultraviolet) range of 248 nm to 157 nm, within which range there are no other optical materials than synthetic quartz and calcium fluoride that are usable as the lens material of the projection optical system. A monochromatic lens of total refraction type, made of only synthetic quartz, is used as the projection lens for KrF excimer laser. A partially achromatic lens of total refraction type, made of synthetic quartz and calcium fluoride, is used as the projection lens for ArF excimer laser. Since KrF excimer laser and ArF excimer laser have a natural oscillation spectral line width as wide as approximately 350 to 400 pm, the use of such projection lenses produces chromatic aberration with a drop in resolution. The laser light emitted from such gas laser devices therefore needs to be reduced in spectral line width so that the chromatic aberration is negligible. For that purpose, such gas laser devices include a line narrowing module having a line narrowing element (such as etalon and grating) in their laser resonator so as to narrow the spectral line width.

(Immersion Lithography and Polarized Illumination)

The foregoing ArF excimer laser immersion lithography with a $H_2O$ medium provides a refractive index of 1.44. This in principle can increase the numerical aperture NA of the lens, which is proportional to the refractive index, by 1.44 times as compared to the conventional numerical aperture. The higher NA, the greater the effect of the polarization of the light source, i.e., the laser light. NA has no effect with TE polarization where the direction of polarization is parallel to that of the mask pattern. With TM polarization orthogonal thereto, higher NA lowers the image contrast. The reason is that the electric field vector at the focus on the wafer is in a different direction in the latter case. The intensity decreases with the increasing angle of incidence on the wafer as compared to when the electric field vector is in the same direction. The effect increases as NA approaches or exceeds 1.0, which case corresponds to the ArF excimer laser immersion. As described above, the illumination system of the exposure apparatus needs to be controlled to a desired polarization state. For such a polarized illumination control, the laser needs to be input to the illumination system of the exposure apparatus as linearly polarized in a desired axial direction.

Description of the laser polarization in an exposure apparatus appears in Denis G. Flagello, Steve Hansen, Bernd Geh, Michael Totzeck, "Challenges with Hyper-NA (NA>1.0) Polarized Light Lithography for Sub λ/4 Resolution," Proceedings of SPIE, Vol. 5754 (2005), pp. 53-68.

In general, the polarization state of polarized light (i.e., linear polarization, elliptical polarization, or circular polarization) is expressed as the sum of mutually orthogonal polarization components. Unpolarized light has mutually orthogonal polarization components of equal light intensities.

As employed herein, a parameter that indicates the polarization state of laser light the exposure apparatus needs will be newly defined. The ratio of the polarization component in a desired axial direction to all the laser light shall be defined as the degree of linear polarization (LP).

The degree of linear polarization indicates the ratio of the light intensity of the linearly polarized component measured in the desired axial direction to the total energy of the laser light. The laser needs to be polarized so as to maintain the degree of linear polarization at a high level.

The degree of linear polarization LP of laser is measured by the following method. As shown in FIG. 28, a polarizer (Rochon prism) is rotated about the optical axis to measure the transmitted light for a maximum intensity Imax and a minimum intensity Imin. The degree of linear polarization is given by the following equation:

$$LP=(I\text{max}-I\text{min})/(I\text{max}+I\text{min}) \qquad (1)$$

Assuming that Imax is the component in the predetermined axial direction where the installation angle γ of the Rochon prism is γ=0°, the installation angle of the Rochon prism for Imin is γ+90°.

In the following description, the polarization state shall refer to linear polarization, circular polarization, or elliptical polarization. The degree of linear polarization shall refer to the parameter expressed by equation (1).

(Conventional Technologies for Increasing the Degree of Linear Polarization)

The conventional technologies for increasing the degree of linear polarization of laser light include ones described in U.S. Patent Application Publication No. 2003/219056 and JP-A-2006-73921.

U.S. Patent Application Publication No. 2003/219056 describes a method in which an optical element intended for laser is arranged so that the optical axis of the laser light runs perpendicularly through the (100) plane of its calcium fluoride crystal. Such an arrangement prevents the degree of linear polarization from deteriorating due to intrinsic birefringence when the light passes through the optical element.

The foregoing conventional technology, however, has the following problem.

When the laser light passes through an optical element in the laser device, the laser light deteriorates in the degree of linear polarization due to the birefringence of the optical element. The birefringence includes stress birefringence which is caused by external mechanical stress and thermal stress, and intrinsic birefringence which intrinsically occurs from the crystal structure without such stresses.

According to the technology described in U.S. Patent Application Publication No. 2003/219056, the optical element is arranged so that the laser light passes perpendicularly through the (100) plane, whereby the degree of linear polarization is prevented from deteriorating due to intrinsic birefringence. The stress birefringence occurring from the application of stresses, however, is highest in the <100> direction perpendicular to the (100) plane. There has thus been a problem that when such an optical element is used as a chamber window, stress birefringence can occur due to the stress for holding the window, the several-atmosphere pressure of the gas in the chamber, thermal stress from laser irradiation, etc.

That is, calcium fluoride crystal windows mounted on a conventional laser gas discharge chamber have been proposed mainly to solve the problem of intrinsic birefringence, whereas the calcium fluoride crystal windows entail the problem of birefringence due to mechanical and thermal stresses.

The crystal is cut at an angle of 17.58° or 26.76° with respect to the (111) plane. The use of such a cut surface on both sides of the chamber windows has had the following two problems. A first problem is that the cut surfaces are not capable of high precision polishing with low surface roughness. This lowers the threshold of surface damage from laser irradiation. A second problem is that when such a crystal is used as a chamber window, the gas pressure of approximately 4000 hPa can cause a breakage in the (111) plane which is prone to cleavage. When the cut surfaces are cut at 17.58° to the (111) plane, the angle formed between the chamber window and the optical axis is 70°, and the Fresnel reflections of P-polarized light and S-polarized light are 4.2% and 30.0%, respectively. While the transmission through the window selects the P-polarized component, the high Fresnel reflection of the S-polarized light makes it difficult to secure the laser output.

In the laser resonator, the laser light reciprocates a number of times through the gas discharge chamber which is equipped with two windows. The P-polarization Fresnel reflection as low as 4.2% can thus cause the problem of low laser output.

JP-A-2006-73921 discloses an optical element for ultraviolet gas laser, such as a window, which is made of a calcium fluoride crystal having two flat surfaces, an ultraviolet ray entering the crystal from one of the flat surfaces and emerging from the other flat surface. At least either one of the flat surfaces is parallel to the (110) crystal plane of the calcium fluoride crystal. With such technology, the degree of linear polarization is prevented from deteriorating due to intrinsic birefringence and stress birefringence. The smooth cut surfaces prevent the production of cracking and defects by laser irradiation.

According to the technology described in JP-A-2006-73921, the degree of linear polarization is prevented from deteriorating due to intrinsic birefringence and stress birefringence, and the calcium fluoride crystal is cut along the (110) plane. Such a configuration, however, has had the possibility of causing cleavage during use because of the chamber gas pressure acting perpendicularly on the window and the mechanical stress for holding the window. That is, there has been the possibility that a slip occurs inside the crystal along the (111) plane or cleavage plane, possibly even breaking the window.

SUMMARY OF THE INVENTION

The present invention has been achieved in view of the foregoing problems of the conventional technologies. It is thus an object of the present invention to provide a gas discharge chamber that uses a calcium fluoride crystal which reduces a breakage due to mechanical stress (window holder and gas pressure), thermal stress from light absorption, and the like, increases the degree of linear polarization of the output laser light, and suppresses a drop in the degree of linear polarization due to strong ultraviolet (ArF, in particular) laser light irradiation.

In view of the foregoing, a gas discharge chamber according to a first invention includes: a chamber; a laser gas that is sealed in the chamber; a means for exciting the laser gas; and a first window and a second window that are mounted on the chamber and through which light occurring from the excited laser gas is emitted outside the chamber, the first window and the second window being arranged along an optical axis. The first window and the second window are made of birefringent crystals. The crystals of the first window and the second window are arranged with respect to a laser optical axis so that laser light of a first polarization state incident on the first window is transmitted through the first window and converted into a second polarization state, and the laser light of the second polarization state passes through the excited laser gas and is transmitted through the second window and generally converted from the second polarization state into the first polarization state.

A second invention is the first invention, wherein the crystals of the first window and the second window are arranged with respect to the laser optical axis so that the first polarization state and the second polarization state are generally the same.

A third invention is the first or second invention, wherein: the first window and the second window of the chamber are arranged to tilt generally in the same direction; and the first polarization state is P-polarization with respect to the first window and the second window.

A fourth invention is the third invention, wherein the second polarization state is elliptical polarization.

A gas discharge chamber according to a fifth invention includes: a chamber; a laser gas that is sealed in the chamber; a means for exciting the laser gas; and a first window and a second window that are mounted on the chamber and through which light occurring from the excited laser gas is emitted outside the chamber, the first window and the second window being arranged along an optical axis. The first window and the second window have an incident plane and an emitting plane in parallel with a (111) crystal plane of their calcium fluoride crystal. With respect to an arrangement such that laser light entering the calcium fluoride crystal passes along a plane including a <111> axis and a <001> axis of each of the first window and the second window as seen from inside the chamber, the first window and the second window are arranged in positions rotated in the same direction by the same angle about their <111> axis.

The first window and the second window mounted on the gas discharge chamber are made of birefringent crystals. The crystals of the first window and the second window are arranged with respect to the laser optical axis so that the laser light of the first polarization state incident on the first window is transmitted through the first window and passes through the excited laser gas in the second polarization state, and the laser light of the second polarization state is transmitted through the second window and generally returns to the first polarization state. Such a configuration makes it possible to suppress a drop in the degree of linear polarization despite the transmission or reciprocation of the laser light through the gas discharge chamber.

The crystals of the first window and the second window are arranged with respect to the laser optical axis so that the first polarization state and the second polarization state are generally the same. Such an arrangement makes it possible to suppress a drop in the degree of linear polarization despite the transmission or reciprocation of the laser light through the gas discharge chamber.

The first window and the second window of the chamber are arranged to tilt generally in the same direction. The first polarization state is linear polarization with respect to the P-polarization of the first window and the second window. Such a configuration can reduce the Fresnel reflection of the P-polarized light at the surfaces of the first window and the second window, thereby reducing the resonator loss of the laser for increased amplification efficiency.

An optical element for gas laser according to the present invention has crystal surfaces on (111) planes. This allows high precision polishing with low surface roughness, whereby the absorption of irradiating laser light by latent scratches can be avoided to prevent surface damage.

With respect to the arrangement such that the laser light entering the calcium fluoride crystal passes along a plane including the <111> axis and <001> axis of each of the first window and the second window as seen from inside the chamber, the first window and the second window are arranged in positions rotated in the same direction by the same angle about their <111> axis. The combination of the two windows can cancel the effects of stress birefringence at the windows.

It is also possible to prevent the degree of linear polarization of the laser from deteriorating when the laser gas pressure in the chamber is increased to compensate for a decrease in output due to degradation of the chamber electrode etc. If the two windows are in the same level of degradation, the canceling effect can prevent the degree of linear polarization from deteriorating due to the element degradation.

BRIEF DESCRIPTION OF THE DRAWINGS

FIG. 3 is a diagram showing windows made of calcium fluoride according to the present invention;

FIGS. 4A and 4B are diagrams showing the windows of FIG. 3 as seen from inside the chamber;

FIGS. 23A and 23B are diagrams showing the windows of FIG. 22 as seen from inside the chamber;

FIG. 24 is a diagram showing a case where two chamber windows are attached to tilt in parallel;

FIGS. 25A to 25C are diagrams showing the case where the two chamber windows are attached to tilt in parallel;

FIGS. 27A to 27C are diagrams showing the case where the two chamber windows are tilted in opposite directions.

DETAILED DESCRIPTION OF THE PREFERRED EMBODIMENTS

Hereinafter, an optical element for ultraviolet gas laser and an ultraviolet gas discharge chamber according to an embodiment of the present invention will be described.

Figure 1:
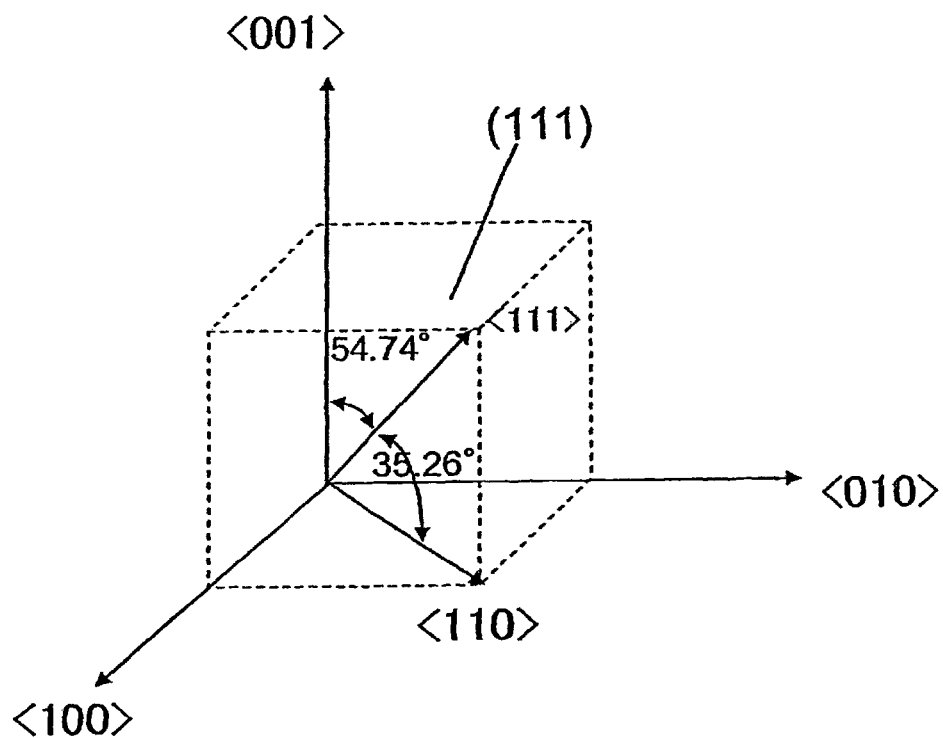
FIG. 1 is a diagram showing the crystal lattice of calcium fluoride.

FIG. 1 shows the crystal lattice of calcium fluoride. In the present embodiment, the calcium fluoride crystal is cut along the crystal orientation of the (111) plane. The calcium fluoride crystal is composed of face-centered cubic lattices such as shown in FIG. 1.

Figure 2:
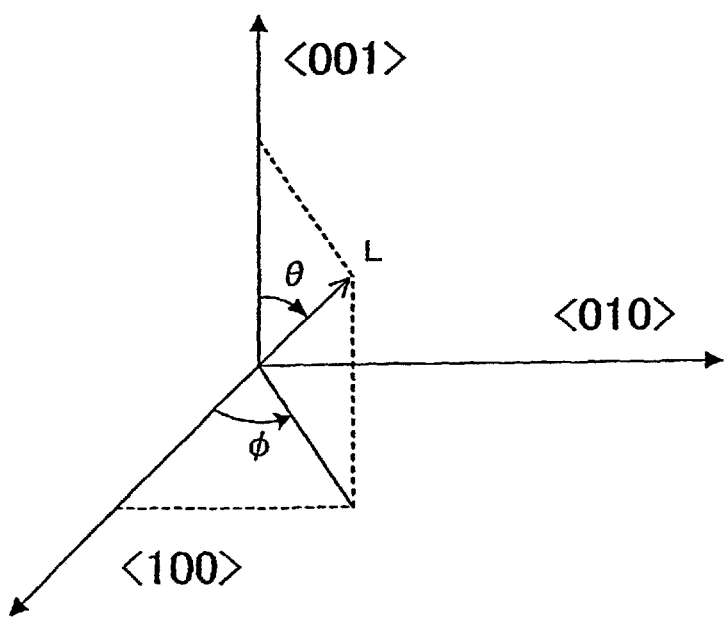
FIG. 2 is a diagram showing the definitions of the angles θ and φ of the traveling direction L of light with respect to the axes <001> and <100> of a calcium fluoride crystal.

The angles θ and φ of the traveling direction L of light with respect to the axes <001> and <100> of the calcium fluoride crystal will be defined as shown in FIG. 2. φ=45° and θ=54.74° in FIG. 2 correspond to the direction of the <111> axis. The surface along the (111) plane is harder than any other surfaces along the crystal axes. This allows polishing with low surface roughness and less latent scratches.

FIGS. 3, 4A, and 4B show a chamber 1 which uses calcium fluoride windows according to the present embodiment. FIG. 3 is a diagram showing the chamber 1. FIG. 4A is a diagram showing a first window 2 as seen from inside the chamber along the arrow A. FIG. 4B is a diagram showing a second window 3 as seen from inside the chamber along the arrow B.

As mentioned previously, the chamber 1 has two windows, or first window 2 and second window 3, which are arranged on an optical axis L. Laser light produced from a not-shown oscillation stage laser is introduced into the chamber 1. A first partial reflection mirror 4 and a second partial reflection mirror 5 make the laser light reciprocate through the first and second windows 2 and 3 a number of times.

More specifically, the laser light produced from the oscillator stage laser is injected as seed light from the back side of the partial reflection mirror 4. The first window 2 and the second window 3 of the chamber 1 are arranged to tilt to the Brewster angle generally in the same direction. The seed laser light is incident as linearly polarized in the direction of the P polarization of the first and second windows. The seed light is transmitted through the first window 2 mounted on the chamber 1. The laser light passes through a discharge-excited laser medium in the chamber 1 for amplification. The laser light is then transmitted through the second window 3 and incident on the partial reflection mirror 5. Part of the laser light is transmitted through the partial reflection mirror and output to the outside as output laser light. Another part of the laser light is reflected and transmitted through the second window 3 again. The laser light passes again through the laser medium, which is discharge-excited by a not-shown discharge electrode in the chamber 1, for further amplification. The laser light is transmitted through the first window 2 and incident on the partial reflection mirror 4. The laser light reflected by the partial reflection mirror 4 is then incident on the first window 2 again. The laser light repeats such operations to reciprocate between the partial reflection mirror 4 and the partial reflection mirror 5 a plurality of times for amplified oscillation. Consequently, the amplified light is output from the partial reflection mirror 5 with the optical characteristics (such as spectral line width) of the amplifier stage maintained. The injection of the linearly P-polarized light into the first and second windows as seed light allows efficient amplification of the seed light because the first and second windows have low Fresnel reflection with respect to P-polarized light. Note that while the first and second windows are desirably arranged at the Brewster angle, the windows may be arranged without causing a significant problem within the range of 45° to 62° where the reflectance to P-polarized light is small.

In the present embodiment, the first window 2 and the second window 3 are made of a calcium fluoride crystal both sides of which are cut along the (111) plane. The windows are arranged obliquely to the laser optical axis L as shown in FIG. 3. In the present embodiment, as shown in FIGS. 4A and 4B, the first window 2 and the second window 3 both are arranged in positions rotated by generally the same angle θ° about the <111> axis from the respective positions where the laser light entering their crystal passes along a plane including the <111> axis and <001> axis when viewed from inside the chamber 1 (see the arrows A and B in FIG. 3). Here, the angle θ2θ shall be positive in the counterclockwise direction, and negative in the clockwise direction.

With the laser light in terms of a single path, the angles of crystal orientation with respect to the optical axis L of the single path are (−θ, +θ), which is considered to be able to cancel a change in phase difference.

More specifically, the laser light of a first polarization state incident on the first window changes into a second polarization state when transmitted through the first window. Then, the calcium fluoride crystals of the first and second windows are oriented with respect to the laser optical axis so that the laser light of the second polarization state generally returns to the first polarization state when transmitted through the second window. As a result, the transmission through the first window and the second window causes little change in the polarization state of the laser light. The amplified laser light output from the partial reflection mirror 5 maintains the same polarization state as that of the seed light from the oscillator stage even after a plurality of times of reciprocations between the partial reflection mirror 4 and the partial reflection mirror 5.

To determine the angles, an X-ray diffraction analysis is preferably performed to measure the <001>, <010>, and <100> axes of crystal orientation in advance. The windows may be marked for the directions of the <001>, <010>, and <100> axes on the respective sides, so that the windows can be rotated by the angle θ° according to the marks for efficient attachment.

Next, description will be given of the state where the optical axis L passes through the windows. The following description will deal with the second window 3. Since the first window 2 has the same configuration as that of the second window 3, description thereof will be omitted.

Figure 5:
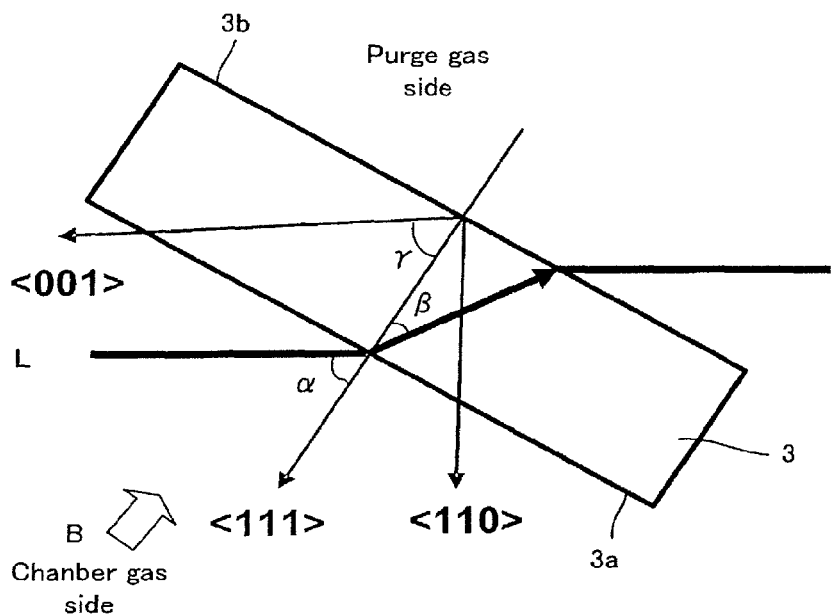
FIG. 5 is a sectional view showing a second window before rotation.
Figure 6:
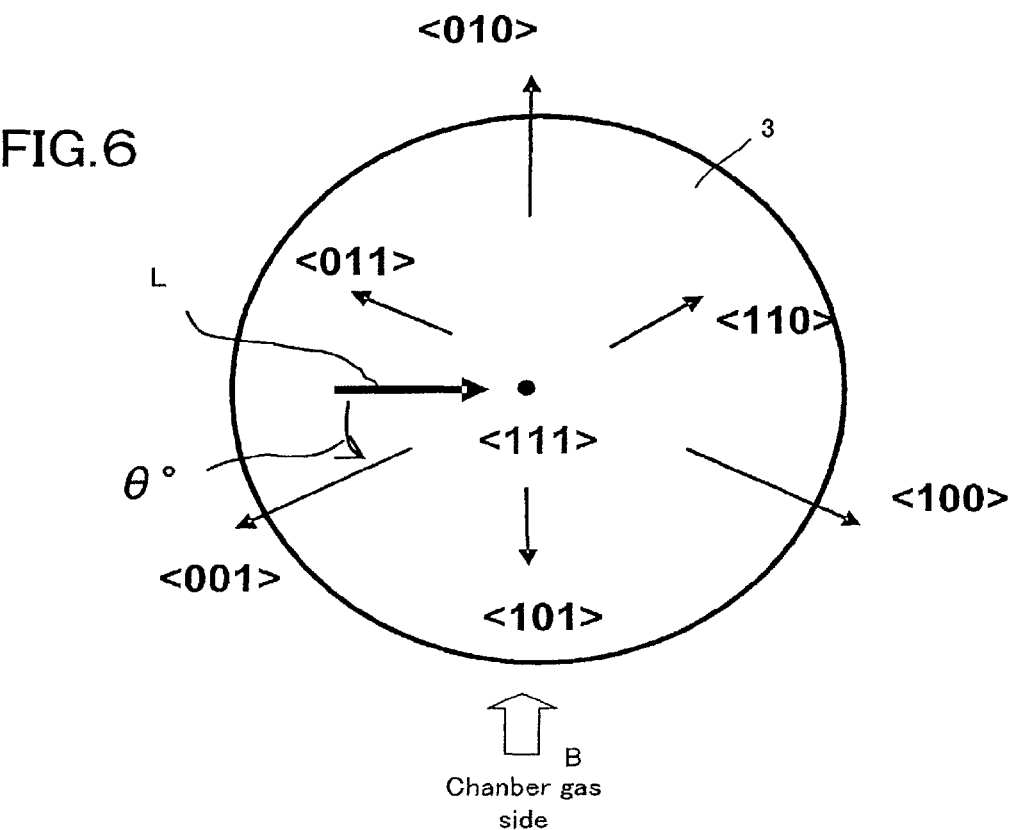
FIG. 6 is a top view of the second window rotated.

FIG. 5 is a sectional view showing the second window 3 made of calcium fluoride according to the present embodiment before rotation. FIG. 6 is a top view showing the second window 3 rotated.

FIG. 5 is a diagram showing the calcium fluoride crystal as seen in a cross section including the <001>, <110>, and <111> axes. The second window 3 made of the calcium fluoride crystal is polished at a first surface 3a and a second surface 3b which are parallel to the (111) plane. For example, in the present embodiment, the laser beam is incident on the center of the second window 3 at an angle of incidence of α=55.7° with respective to the calcium fluoride crystal substrate within the plane that includes the <001>, <110>, and <111> axes. At the first surface 3a, the light is refracted at an angle of refraction of β=33.4° according to the Snell's law. The calcium fluoride crystal is arranged so that the refracted optical axis L in the calcium fluoride passes within the plane including the <001>, <110>, and <111> axes of the calcium fluoride crystal and between the angle formed by the <111> axis and the <001> axis (0°<γ<54.7°). After transmitted through the calcium fluoride crystal, the laser light is emitted from the second window 3 within the plane including the <001>, <110>, and <111> axes at an angle of emission of α=55.7° with respect to the second surface 3b according to the Snell's law again as with the first surface 3a.

While this embodiment deals with the case where the angles of incidence and emission with respect to the window are α=55.7°, the present invention is not limited to such an embodiment. For example, the angles may vary within the range where the laser output will not be lowered by the Fresnel reflection of the P-polarized light of the window, for example, α=45° to 62° or so.

In the present embodiment, the second window 3 is arranged in a position rotated about the <111> axis by the angle θ from such a state.

FIG. 6 is a diagram showing the calcium fluoride crystal as seen from directly above the <111> axis, with the orientation axes of the calcium fluoride crystal in a radial configuration. Since the calcium fluoride crystal is composed of face-centered cubic lattices as shown in FIG. 1, the crystal orientation axes are three-fold symmetrical with the <111> axis as the axis of symmetry. When the calcium fluoride crystal window is viewed from directly above the <111> axis, clockwise angles with reference to the <001> axis shall be negative and counterclockwise angles positive. It follows that the angle formed between the <001> axis and the <011> axis is −60°.

The angle formed between the <001> axis and the <010> axis is −120°. The angle formed between the <001> axis and the <110> axis is 180°. The angle formed between the <001> axis and the <101> axis is 60°. The angle formed between the <001> axis and the <100> axis is 120°. The angle formed between the <001> axis and the <110> axis may be written as −180° (=180°).

As shown in FIG. 6, the second window 3 is arranged in a position rotated about the <111> axis by the angle θ° with respect to the position where the laser light entering the crystal passes along the plane including the <111> axis and the <001> axis.

Next, a change of polarization due to birefringence will be described. In general, light that propagates through a crystal is a linear combination of two mutually orthogonal linearly-polarized waves. The polarization state and the direction of polarization are determined by the phase velocities and amplitudes of the respective waves. When birefringence occurs in the crystal due to thermal stress, mechanical stress, or the like, the light beam propagating through the crystal varies in phase velocity depending on the direction of polarization. Assuming that the light propagating through the crystal is decomposed into two mutually orthogonal directions in the crystal, i.e., a fast axis direction and a slow axis direction, the components of the propagating light in the two directions vary in phase due to a difference in velocity (due to birefringence).

Figure 7:
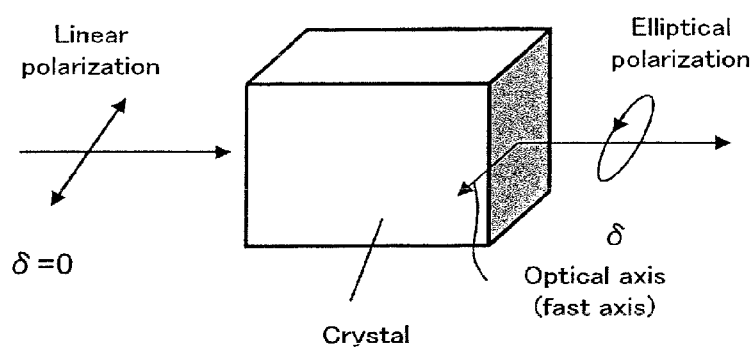
FIG. 7 is a diagram showing the polarization state of a crystal.

Because of such a phenomenon, as shown in FIG. 7, incident light of linear polarization, for example, is emitted as elliptically polarized (circularly polarized if the two components have a phase difference of 90° therebetween), i.e., with a change in the polarization state.

The change of the polarization state shown in FIG. 7 will be detailed below. As shown in the diagram, the crystal has an optic axis that is arranged perpendicular to both the side surfaces of the crystal. Suppose that the optic axis is a fast axis on the horizontal plane. Suppose also that linearly polarized light having a phase difference $\delta=0°$ is incident with the direction of polarization at 45° with respect to the optic axis (fast axis) of the crystal. When the linearly polarized light is transmitted through the crystal, a phase shift of $\delta$ occurs between the fast axis component (Ey) and the slow axis component (Ex) of the linearly polarized light. As a result, the linearly polarized light transmitted through the crystal is converted into elliptical polarization. If $\delta=90°$, the light is converted into circular polarization.

The magnitude of the phase difference resulting from birefringence varies with the crystal orientation of the light propagation. If the light propagates along the crystal orientation of the optic axis, the phase difference is 0 since there occurs no birefringence. In the presence of only intrinsic birefringence of the calcium fluoride crystal, the optic axis is the <111> axis, <001> axis, <100> axis, <010> axis, or equivalent ones.

Figure 8:
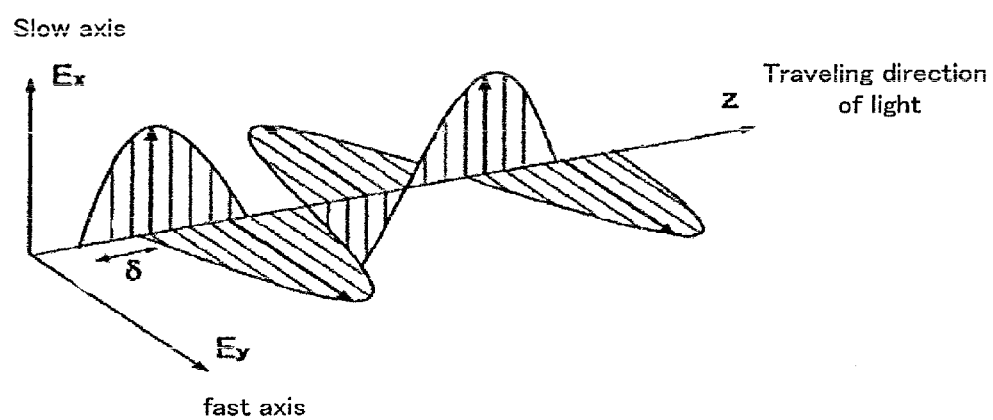
FIG. 8 is a diagram showing a difference in phase.

FIG. 8 schematically shows how a phase difference occurs in linearly polarized light due to crystal birefringence. Specifically, with the linearly polarized light decomposed into two components, or fast axis component (Ey) and slow axis component (Ex), the diagram shows the state of the light where a phase difference $\delta$ occurs from the birefringence of the fast axis component (Ey) and slow axis component (Ex). The Z-axis indicates the traveling direction of the light. As shown in FIG. 8, if the direction of polarization of the incident light is parallel or perpendicular to the fast axis or slow axis of the crystal, there occurs no phase difference since the components do not separate apart.

Now, description will be given of the result of an observation on a change in the polarization state. A measurement window 102 was arranged at the same angle of incidence of light as in the chamber 1, and rotated about the <111> axis to change the crystal orientation of the direction of light propagation for observation.

Figure 9:
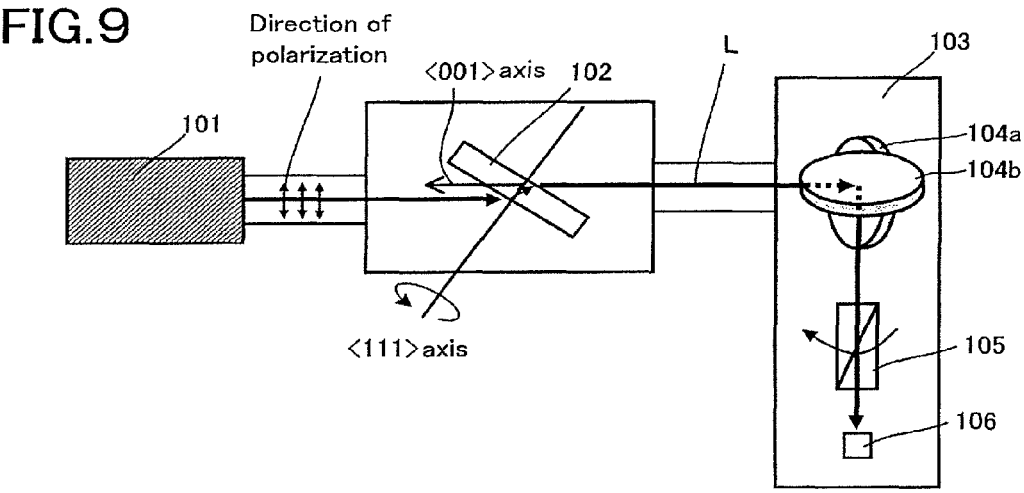
FIG. 9 is a diagram showing a polarization state observation experiment system.

FIG. 9 is a diagram showing the polarization state observation experiment system. A linearly polarized narrow-band ArF laser 101 (4 kHz, 10 mJ) was used for the laser light. In order to simulate the usage as a chamber window, the measurement window 102 was situated at an angle of incidence of $\alpha=55.7°$. The incident laser was polarized in a direction parallel to the plane of FIG. 9 as with the actual device. The laser light transmitted through the measurement window 102 was introduced into a linear polarimeter 103 and measured for the degree of linear polarization. The linear polarimeter 103 used two reflecting windows 104a and 104b to reflect the optical path so as not to change the light intensities of the respective polarization components of the reflected laser light.

Here, the operation of the two reflecting windows 104a and 104b will be described in detail. The laser light transmitted through the measurement window 102 is incident on the reflecting window 104a at an angle of incidence of 45°. The laser light is reflected at an angle of 45° by surface reflection within a plane perpendicular to the plane of the diagram. The laser light is then incident on the reflecting window 104b at an angle of incidence of 45°, and is reflected at an angle of 45° by surface reflection within the plane perpendicular to the plane of the diagram. When the two reflecting windows 104a and 104b thus reflect the light by surface reflection once each, the reflecting window 104a surface-reflects the P-polarized component and S-polarized component of the light at respective different reflectances. The window 104b then surface-reflects the P-polarized light into S-polarized light and S-polarized light into P-polarized light, thereby canceling the reflectances. As a result, it is possible to match the light intensities of the respective polarization components of the light that is reflected by the window 104b with those of the light L that is transmitted through the measurement window 102.

Figure 10:
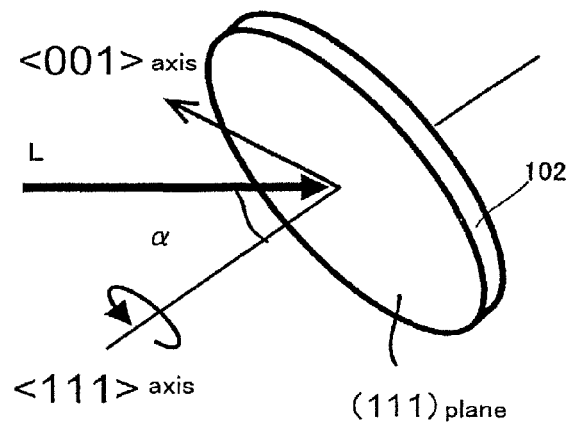
FIG. 10 is a diagram showing a measurement window.

The laser light was passed through a Rochon prism (polarizer) 105, and measured for output by a sensor 106. The Rochon prism 105 was rotated for output measurement, and the degree of linear polarization was determined based on the foregoing equation (1). As shown in FIG. 10, the measurement window 102 was cut along the (111) plane. The measurement window 102 was rotated about the <111> axis at intervals of 10° while measured for a change in the degree of linear polarization within the range of 0° to approximately 180°.

Figure 11:
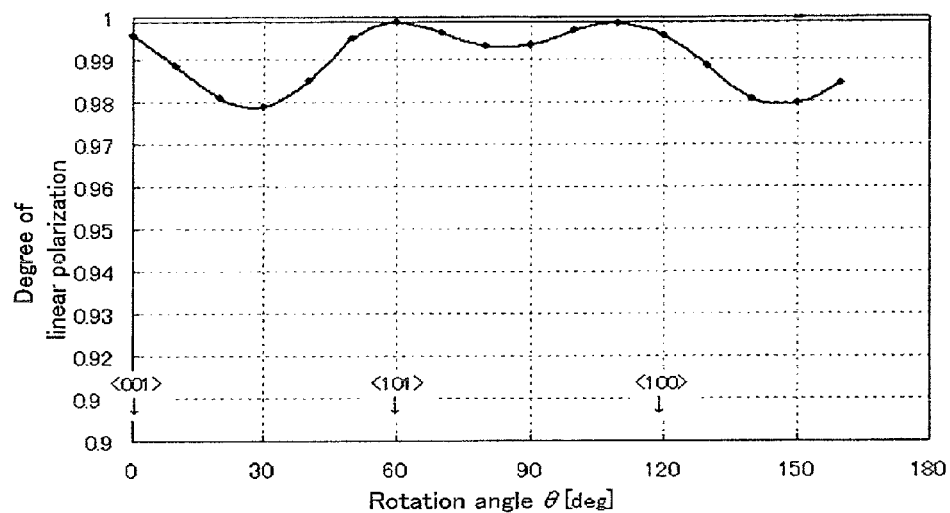
FIG. 11 is a graph showing measurements of the degree of linear polarization vs. rotation angle when incident laser light has a degree of linear polarization of 0.999.

FIG. 11 is a graph showing the measurements of the degree of linear polarization vs. the rotation angle when the incident laser light had a degree of linear polarization of 0.999. $\theta=0°$ indicates that the optical axis L is in the <001> axis direction. The positive rotation angles $\theta$ indicate that the measurement window 102 was rotated counterclockwise.

As shown in FIG. 11, it can be seen that the degree of linear polarization drops at $\theta=30°$, 90°, and 150°, or at intervals of approximately 60°. Conversely, the degree of linear polarization changes little in orientations of $\theta=0°$, 60°, and 120°. This shows that the light varies little in phase difference when propagating in the directions of the <001> axis and the <101> axis, and varies in phase difference when propagating at intermediate angles. In particular, it can be seen that the angle of 30° off the <001> axis direction is a point of inflection in the change of phase difference.

Figure 12:
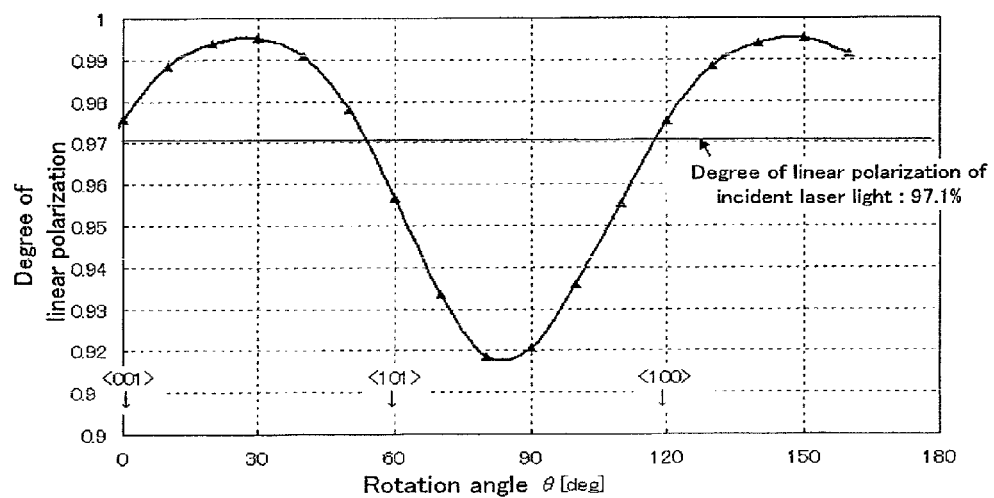
FIG. 12 is a graph showing the measurements of the degree of linear polarization vs. rotation angle when the incident laser light has a degree of linear polarization of 0.971.

FIG. 12 is a graph showing the measurements of the degree of linear polarization vs. the rotation angle when the incident laser light had a degree of linear polarization of 0.971. Again, the degree of linear polarization of the transmitted laser light coincides with that of the incident light in the vicinities of $\theta=0°$, $60°$, and $120°$. The degree of linear polarization shows maximum changes in the vicinities of $\theta=30°$, $90°$, and $150°$.

More specifically, the laser light transmitted through the measurement window 102 has generally the same degree of linear polarization as that of the incident laser light in the vicinities of $\theta=0°$, $60°$, and $120°$. The degree of linear polarization peaks at around $\theta=30°$ and $150°$, and falls to the minimum at around $\theta=90°$. A comparison between the cases of the rotation angle $\theta=0°$ and $120°$ and the case of $\theta=60°$ shows that the degree of linear polarization comes to a local maximum at $60°$, where the same degree of linear polarization as that of the incident light is maintained. As compared to the cases of the rotation angle $\theta=0°$ and $120°$, the rotation angle $\theta=60°$ therefore has the advantage that the degree of linear polarization can be maintained even with a poor installation accuracy in terms of the rotation angle. The same result is considered to follow at $\theta=120°$ and $\theta=-120°$ since the calcium fluoride crystal has a three-fold symmetrical crystal structure.

A probable reason for such a relationship between the rotation angle and the degree of linear polarization as shown in the graph of FIG. 12 will be described below. The light is considered to vary little in phase difference when propagating in the direction where the rotation angle is $0°$ (<001> axis) or $60°$ (<101> axis), and to vary in phase difference when propagating at intermediate angles. In particular, the angles of $30°$ and $90°$ off the <001> axis direction are points of inflection in the change of phase difference (a local maximum and a local minimum, respectively). The reason why the degree of linear polarization improves with the change in phase is considered to be that the light shifts to decrease in phase difference when passing through the crystal.

What FIGS. 11 and 12 have in common is that the laser light transmitted through the measurement window 102 varies little in the degree of linear polarization at the rotation angles $\theta=0°$, $60°$, and $120°$.

Figure 13:
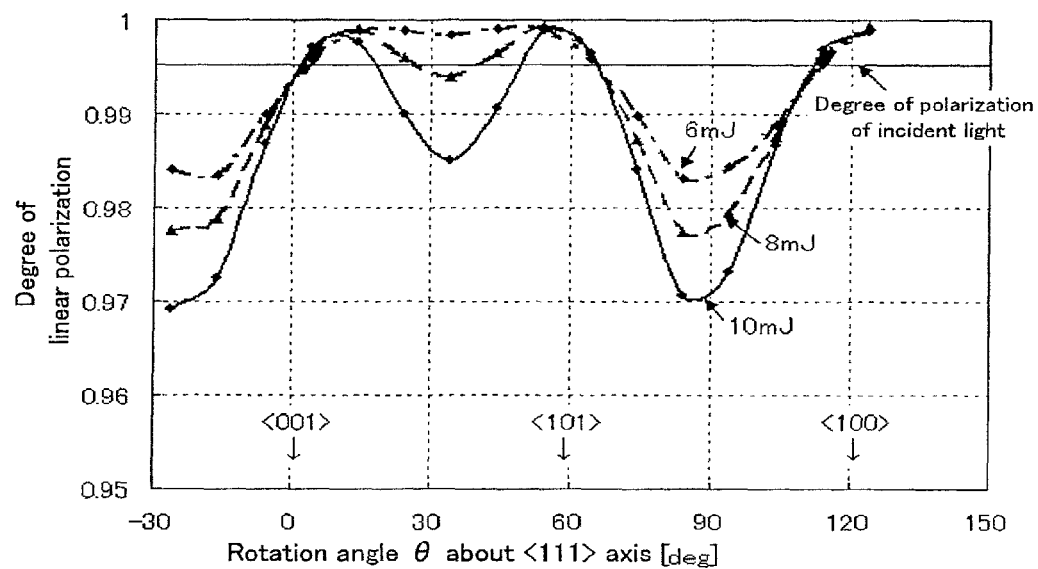
FIG. 13 is a graph showing measurements of the degree of linear polarization vs. rotation angle when the pulse energy of the incident light is changed.

FIG. 13 is a graph showing the measurements of the degree of linear polarization vs. the rotation angle when the pulse energy was changed under the condition that the incident light had a degree of linear polarization of approximately 0.995 and a repetition frequency of 4 kHz. It was found that the local minimum values in the vicinities of the rotation angles $\theta=-30°$, $30°$, and $90°$ become smaller with the increasing energy of the incident light.

A probable reason for such measurements will be described below. When the pulse energy of the incident laser light is changed, the phase difference is considered to vary in magnitude. More specifically, the absorption of the laser light by the window generates heat, so that the stress birefringence from the resulting thermal stress varies in magnitude. Since such a characteristic depends on the stress birefringence, it can be seen that there is little birefringence in the directions of the <001> axis and the <101> axis (the axes with rotation angles of $\theta=0°$ and $60°$), and the phase difference peaks at $30°$ therebetween.

Hereinafter, a probable principle of transmission through the first and second windows with no change in the degree of linear polarization will be described with reference to FIGS. 14, 15A, 15B, and 16.

Figure 14:
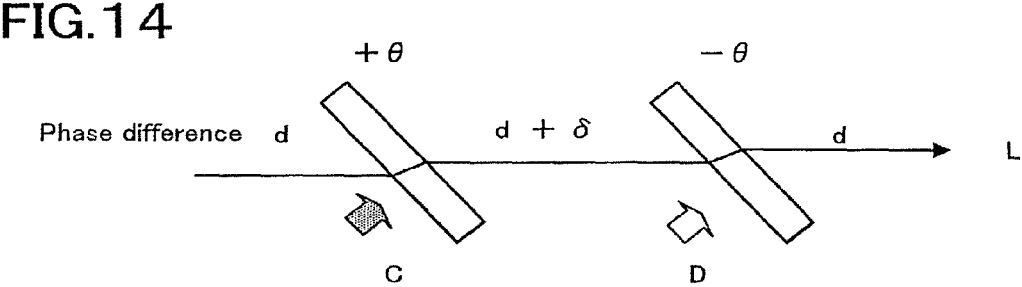
FIG. 14 is a sectional view showing how laser light passes through two windows.
Figure 15A:
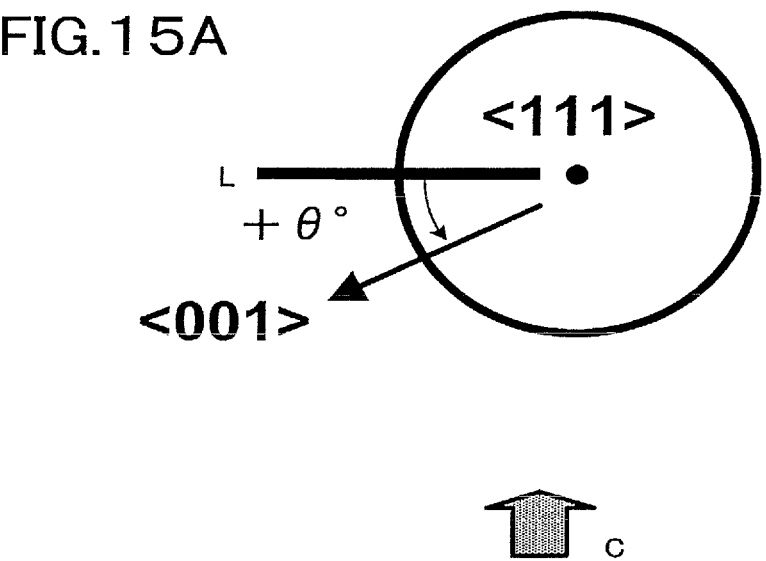
FIGS. 15A and 15B are diagrams showing the windows as seen along the arrows of FIG. 14.
Figure 15B:
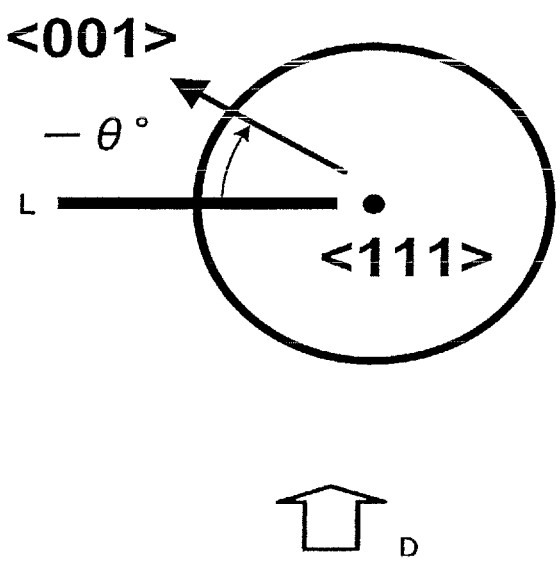
Figure 16:
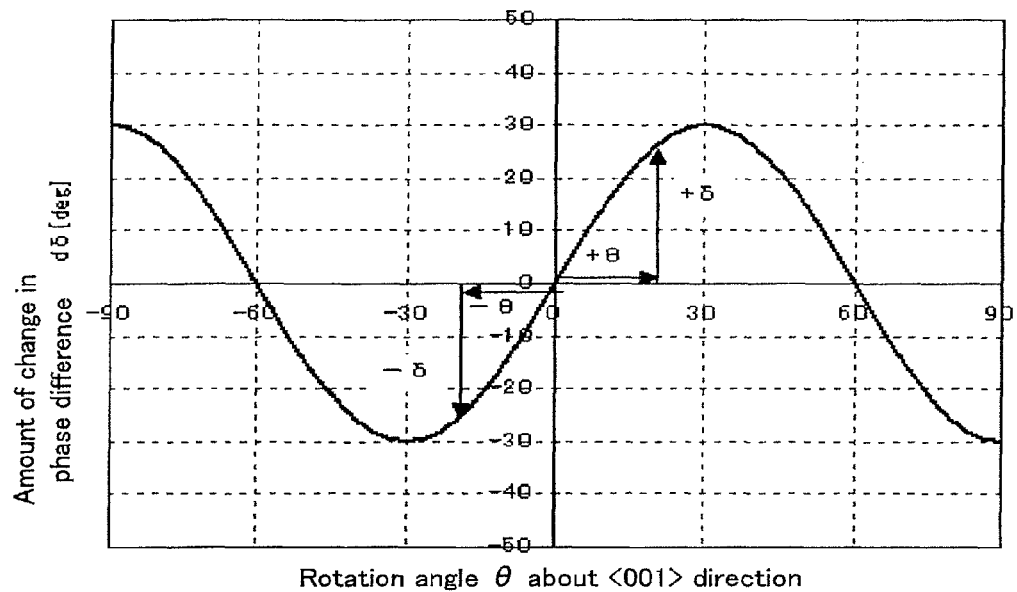
FIG. 16 is a graph showing the rotation angle and phase change of a window.

FIGS. 14, 15A, and 15B are diagrams showing how laser light passes through two windows. FIG. 16 is a graph schematically showing the rotation angles of the windows and a change in phase. FIG. 14 is a sectional view showing how the laser light passes through the two windows. FIG. 15A is a diagram showing the first window as seen along the arrow C of FIG. 14. FIG. 15B is a diagram showing the second window as seen along the arrow D of FIG. 14.

As shown in FIGS. 14, 15A, and 15B, a single window positioned at $+\theta$ in crystal orientation can change the phase difference d of the light by $+\delta$. A window positioned at $-\theta$ in crystal orientation, on the other hand, can change the phase difference d of the light by $-\delta$. With the combination of the two windows adjusted to the angles of $+\theta$ and $-\theta$, as shown in FIG. 16, light of any polarization state can be restored to the original polarization state when passed through the two windows. This can consequently reduce the change (decrease) of the degree of linear polarization.

Moreover, it is possible to restore the change in the polarization state due to the thermal stress of one window with the other window (cancel the change in phase difference). That is, the effects of stress birefringence of the two windows can be combined to cancel out. The amplitude (change) $\delta$ of the phase difference varies depending on the manufacturer and grade of the calcium fluoride crystal. For efficient canceling, it is preferred to combine two windows of the same manufacturer and the same grade, having the same phase difference amplitude (change).

Now, description will be given of the result of an observation on a change in the degree of linear polarization. In an experimental chamber 221, experimental first and second windows 222 and 223 were rotated about their <111> axis to change the crystal orientation of the direction of light propagation. The gas pressure in the chamber was also changed.

Figure 17:
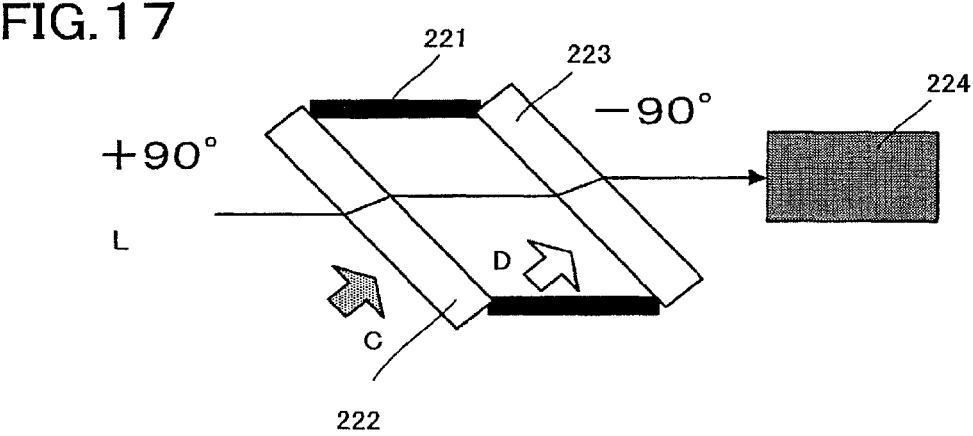
FIG. 17 is a diagram showing a polarization state observation experiment system using a experimental chamber.
Figure 18A:
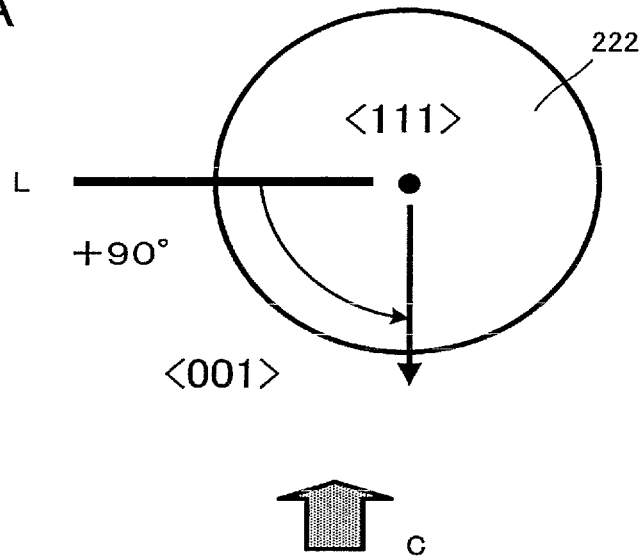
FIGS. 18A and 18B are diagrams showing experimental windows as seen along the arrows of FIG. 17.
Figure 18B:
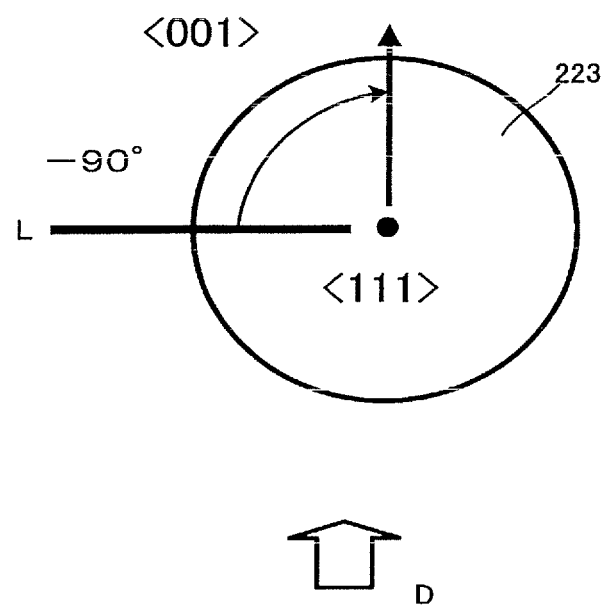

FIGS. 17, 18A, and 18B are diagrams showing a linear polarization degree observation experiment system using the experimental chamber 221. As shown in FIG. 17, the experimental chamber 221 was fabricated which had the experimental first and second windows 222 and 223 and was capable of applying gas pressure inside. Laser light was transmitted through the chamber and measured for effect by a linear polarimeter 224.

FIG. 18A shows the experimental first window 222 as seen along the arrow C of FIG. 17. FIG. 18B is a diagram showing the experimental second window 223 as seen along the arrow D of FIG. 17. In a first arrangement, the experimental first window 222 was rotated $+90°$ and the experimental second window 223 was rotated $-90°$ about their <111> axis. In a second arrangement, the experimental first window 222 was rotated $+90°$ and the experimental second window 223 was rotated $+90°$ about their <111> axis. In the experiment, the first and second arrangements were compared for the degree of linear polarization. Here, counterclockwise angles are indicated by a positive sign, and clockwise angles by a negative sign.

Figure 19:
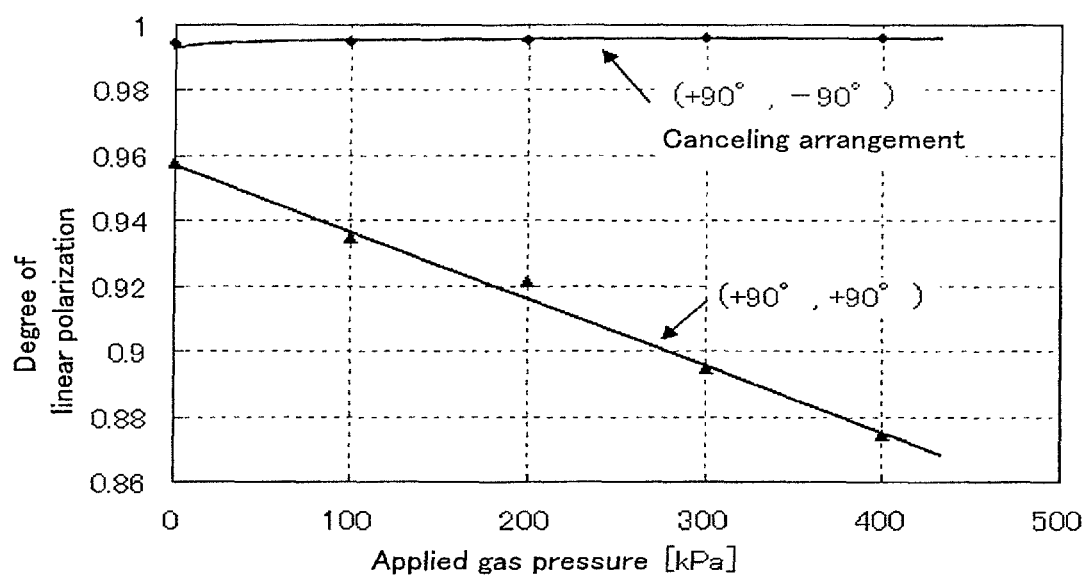
FIG. 19 is a graph showing the measurements of the degree of linear polarization vs. gas pressure.

FIG. 19 is a graph showing the measurements of the degree of linear polarization vs. the gas pressure. With the second arrangement ($+90°$, $+90°$) where the windows were arranged in the same crystal orientation, it can be seen that the birefringence effect was twice as much and the degree of linear polarization decreased with increasing mechanical stress from the increasing gas pressure. When the experimental first and second windows 222 and 223 were in the first arrangement ($+90°$, $-90°$), the degree of linear polarization did not change (decrease) even with the increasing mechanical stress from the gas pressure. The same characteristic was observed from ($+30°$, $-30°$) and ($+0°$, $-0°$) arrangements. The degree of linear polarization did not change even in the ($+30°$, $-30°$) and ($+0°$, $-0°$) arrangements. The canceling arrangement such as the first arrangement of the experimental first and second windows 222 and 223 can thus reduce a drop in the degree of linear polarization even under mechanical stress from the gas pressure.

Such an arrangement is also effective for the following reasons.

(1) The output of the laser device decreases during use because of the degradation of the chamber electrode etc. To compensate for the decrease in output, the laser gas pressure in the chamber is increased. In the absence of the crystal orientation relationship according to the present invention, higher stress birefringence from the increased gas pressure will lower the degree of linear polarization of the laser. The arrangement of the present invention can prevent the degree of linear polarization of the laser from deteriorating due to the increased gas pressure.

(2) When the laser is in use, the windows themselves degrade due to the light irradiation. This will mostly lead to higher absorption and increased thermal stress. If the two windows used as the chamber windows are in the same level of degradation, the canceling effect of the present invention can prevent the degree of linear polarization from deteriorating due to the element degradation.

Figure 20:
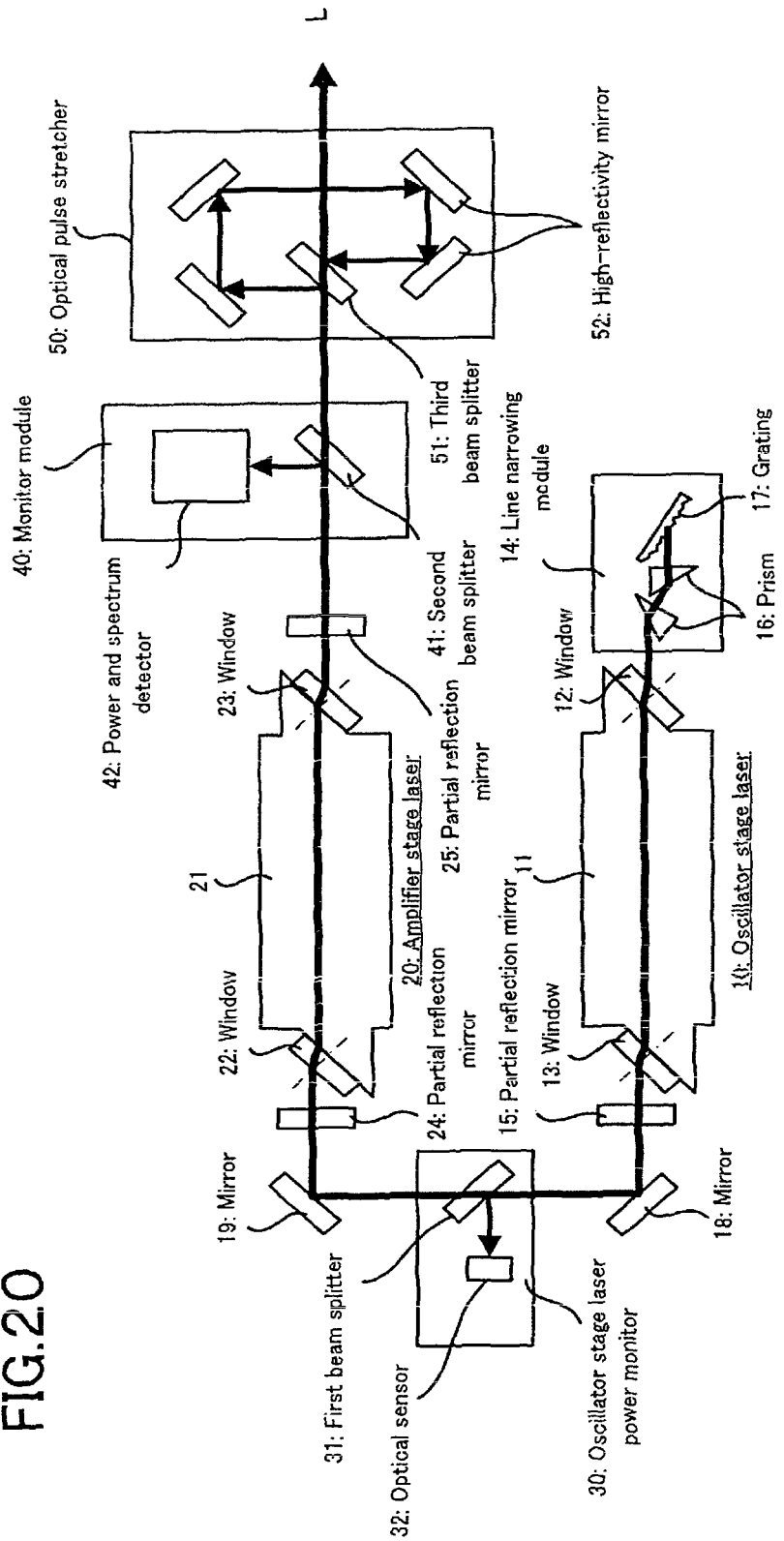
FIG. 20 is a diagram showing a two-stage laser system.

Up to this point, the optical element for gas laser according to the present embodiment has been described. To illustrate an example of the optical element, FIG. 20 shows the schematic configuration of a two-stage laser system, or mainly of the optical system thereof, and an arrangement example of optical elements for ultraviolet gas laser according to the present invention.

The two-stage laser system includes an oscillation stage laser 10 and an amplifier stage laser 20 which amplifies incident laser light (seed light) that is produced from the oscillator stage laser 10. The two-stage laser system is expected to be applied to an ArF excimer laser device and an $F_2$ laser device for exposure, where a narrow-band high output of 40 W or higher is needed in particular.

The oscillator stage laser 10 includes a chamber 11 in which a laser gas is sealed, and a line narrowing module 14 and a partial reflection mirror 15 which constitute a resonator. The partial reflection mirror 15 serves as an output mirror. A not-shown laser gas excitation system, control system, cooling system, gas exchange system, and the like are also included.

The chamber 11 has two windows 12 and 13 which are arranged on the optical axis L as mentioned above. The line narrowing module 14 includes one or a plurality (in the diagram, two) of beam expanding prisms 16 which constitute a beam expander optical system, and a grating 17 (or etalon) as a line narrowing element. The grating 17 shown in the diagram is situated in a Littrow arrangement so that the angle of incidence coincides with the angle of diffraction. In the Littrow arrangement, the grating 17 functions as a line narrowing element as well as the rear mirror of the oscillator stage laser 10. When an etalon is used as the line narrowing element, a rear mirror needs to be arranged behind the etalon.

The amplifier stage laser 20 includes a chamber 21 in which a laser gas is sealed, and partial reflection mirrors 24 and 25 which constitute a resonator. A not-shown laser gas excitation system, control system, cooling system, gas exchange system, and the like are also included.

The chamber 21 has two windows 22 and 23 which are arranged on the optical axis L. In FIG. 20, the two-stage laser system is configured so that the laser light produced from the oscillator stage laser 10 is reflected by mirrors 18 and 19 and incident on the amplifier stage laser 20. Since the laser windows are arranged in the resonators of the oscillator stage and amplifier stage lasers, the laser light reciprocates a number of times (a plurality of times).

Hereinafter, the monitoring of the laser light output from the oscillator stage laser, the amplification of the laser light, and an optical pulse stretching mechanism will be described in detail.

The laser light output from the oscillator stage laser 10 is initially reflected by the mirror 18 with high reflectivity. The laser light is then incident on an oscillator stage laser power monitor 30. The oscillator stage laser power monitor 30 includes a first beam splitter 31 and an optical sensor 32.

Part of the oscillator stage laser light is reflected by the beam splitter 31 and incident on the optical sensor 32, where the output of the oscillator stage laser 10 is monitored. The laser light transmitted through the first beam splitter 31 is reflected by the mirror 19 with high reflectivity, and injected through the back side of the partial reflection mirror 24 as seed light. The seed light is then injected into the resonator of the amplifier stage laser, i.e., between the partial reflection mirror 24 and the partial reflection mirror 25.

In synchronization with the injection of the seed light, a not-shown discharge electrode arranged in the chamber 21 discharges to excite the laser gas. The seed light passes through the excited gas for amplification. Here, the seed light in a first polarization state is converted into a second polarization state when transmitted through the first window 22, and passes through the excited area for amplification. The laser light returns to the first polarization state when transmitted through the second window 23.

Reaching the partial reflection mirror 25, part of the laser light is transmitted and output as laser light. Another part of the laser light is reflected back into the resonator composed of the partial reflector mirrors 24 and 25 as feedback light. The feedback light is in the first polarization state. The feedback light is incident on the second window 23, and converted into the second polarization state when transmitted through the second window 23. The laser light passes through the amplification area for amplification, and is converted back into the first polarization state when transmitted through the first window 22. Part of the laser light is reflected by the partial reflection mirror 24 and incident on the first window again as the laser light of the first polarization state. Such amplification and oscillation of the seed light allows an increased output while maintaining the spectrum and polarization state of the laser light that is output from the oscillator stage laser.

The laser light output from the partial reflection mirror 25 is incident on a monitor module 40. The monitor module 40 includes a second beam splitter 41 for sampling the output laser light. The sampled light is input to a power and spectrum detector 42 for detecting the pulse energy and spectrum of the output laser light. The laser light passed through the monitor module 40 is incident on an optical pulse stretcher 50 for stretching the time width of the laser pulses.

The optical pulse stretcher 50 includes a third beam splitter 51 for inputting part of the laser beam into an optical delay circuit, and four high-reflectivity mirrors 52 which constitute the optical delay circuit. Part of the laser light is simply transmitted through the third beam splitter 51 and input to a now-shown exposure apparatus. In the meantime, the light reflected by the third beam splitter 51 is passed through the optical delay circuit composed of the four high-reflectivity mirrors 52, and reaches the third beam splitter 51 again as delayed laser pulse light. Part of the reflected light is input to the exposure apparatus. Part of the transmitted light enters the optical delay circuit again. Such operations can be repeated to supply laser pulses having a stretched pulse width to the exposure apparatus.

Now, the second beam splitter and the third beam splitter through which the high power laser beam passes may cause birefringence due to thermal stress, possibly with a deterioration in the degree of linear polarization. Calcium fluoride crystals polished along the (111) plane are then used for the beam splitters. The beam splitters can be arranged at a rotation angle of θ=0°, 60°, 120°, 180° (=−180°), −60°, −120° or so about the <111> axis to suppress the deterioration in the degree of linear polarization. The first beam splitter 31 can also be made of the same crystal and arranged in the same orientation so that the output light of the oscillator stage laser is injected into the amplifier stage laser 20 as seed light with little deterioration in the degree of linear polarization.

Consequently, it is possible to obtain laser output light with a high degree of linear polarization by polishing the surfaces of the calcium fluoride crystals along the (111) plane and rotating the calcium fluoride crystals about the <111> axis.

That is, when calcium fluoride crystals having the (111)-plane surfaces are used as the windows 22 and 23 of the laser chamber 21, the crystals are rotated and arranged about the <111> axis so that the laser light does not vary in the polarization state before and after the transmission through the two windows 22 and 23. This makes it possible to obtain laser output light with a high degree of linear polarization even at high output.

The windows 12, 13, 22, and 23 attached to the chambers 11 and 21 are desirably made of optical elements for ultraviolet gas laser according to the present invention.

The present invention provides the same effect when applied to a MOPA (Master Oscillator Power Amplifier) system where the partial reflection mirrors 24 and 25 of the amplifier stage laser 20 are detached, and a system of ring amplification type.

Figure 21:
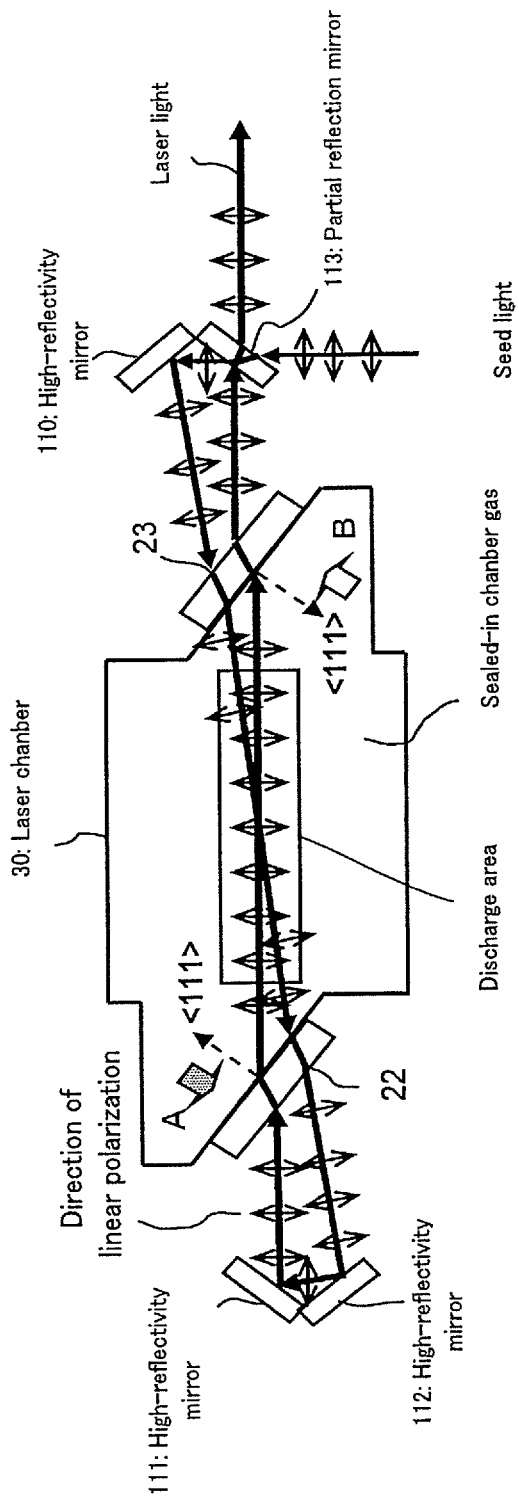
FIG. 21 is a diagram showing a case where a ring resonator is applied to the amplifier stage laser.

FIG. 21 shows an embodiment where the present invention is applied to a system of ring amplification type. The seed light of a first polarization state output from the oscillator stage laser is injected into the ring resonator through a partial reflection mirror 113, which is an output coupling mirror of the ring resonator, at an angle of 45°. A first window 22 and a second window 23 of the chamber 21 are arranged to tilt at the Brewster angle generally in the same direction. The seed laser light is incident as linearly polarized in the direction of the P polarization of the first window 22 and the second window 23. The laser light is incident on and reflected by a high-reflectivity mirror 110 at an angle somewhat smaller than 45°. The laser light in the first polarization state is transmitted through the second window 23, thereby being converted into a second polarization state. The laser light passes through the discharge area for amplification, and is transmitted through the first window 22 to return to the first polarization state.

The laser light is then incident on and reflected by a high-reflectivity mirror 112 at the same angle as with the high-reflectivity mirror 110, reflected by a high-reflectivity mirror 111 at 45° in the first polarization state, and incident on the first window 22. The laser light is converted into a second primed polarization state when transmitted through the first window 22. The laser light then passes through the laser discharge area for amplification. The amplified light returns to the first polarization state when transmitted through the second window 23. The laser light is incident on the partial reflection mirror 113 at an angle of incidence of 45°. Part of the laser light is transmitted through the partial reflection mirror 113 and output as output laser light. In the meantime, the reflected light returns to the ring resonator as feedback light. It should be noted that the second polarization state and the second primed polarization state are almost the same, but strictly are different since the angles of incidence to the window are slightly different. Since the canceling effect from the first and second windows is the same, the laser light is transmitted through the partial reflection mirror 113 and output with high pulse energy in almost the same polarization state as that of the seed light.

While the present embodiment has dealt with the case where the first and second windows are arranged at the Brewster angle, the present invention is not limited to such an embodiment. Angles of incidence within the range of 45° to 62° present no significant problem.

The calcium fluoride windows polished along the (111) plane may be arranged at rotation angles of θ=0°, 60°, 120°, 180° (=−180°), −60°, or −120° about the <111> axis, where the first polarization state and the second and second primed polarization states are generally the same.

Next, a reference example will be described. The foregoing embodiments have dealt with the cases where the chamber windows are made of calcium fluoride crystals. However, the present invention is not limited to calcium fluoride crystals. For example, the present invention is applicable with the same principle when the first chamber window 2 and the second chamber window 3 are made of $MgF_2$ crystals which are usable in the wavelength band of excimer laser.

Figure 22:
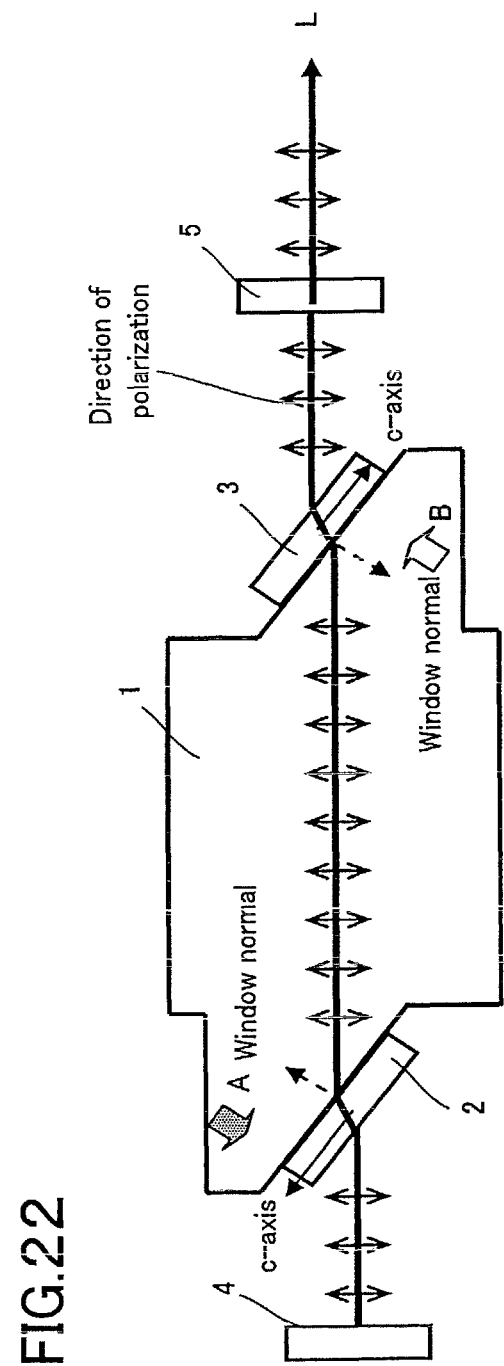
FIG. 22 is a diagram showing a chamber as a reference example.
Figure 26:
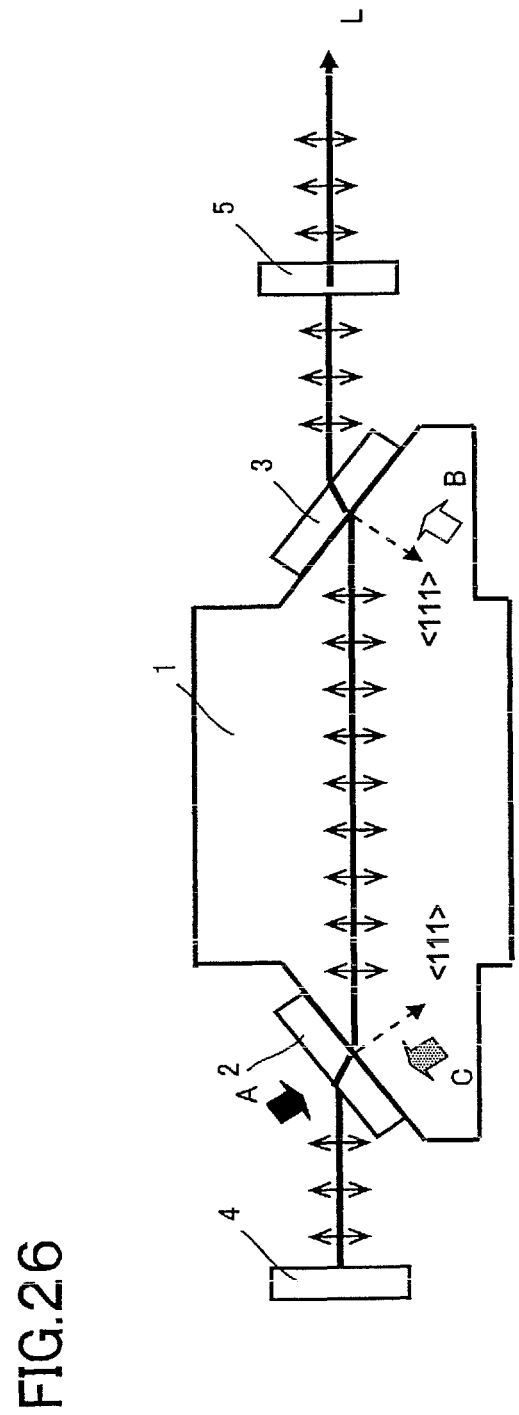
FIG. 26 is a diagram showing a case where two chamber windows are tilted in opposite directions.
Figure 28:
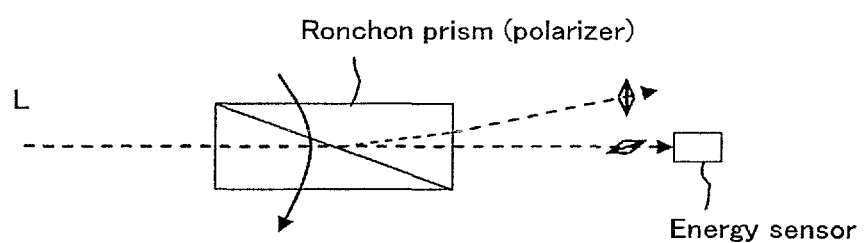
FIG. 28 is a diagram showing the measurement of transmitted light intensity.

FIGS. 22, 23A, and 23B show a chamber 1 that uses $MgF_2$ (magnesium fluoride) windows according to the reference example. FIG. 22 is a diagram showing the chamber 1. FIG. 23A is a diagram showing the first window 2 as seen from inside the chamber along the arrow A. FIG. 23B is a diagram showing the second window 3 as seen from inside the chamber along the arrow B.

$MgF_2$ in principle has a larger band gap than that of calcium fluoride, and thus has higher laser resistance against ArF laser. The $MgF_2$ crystal has a tetragonal crystal structure. With a- and c-axis crystal lattices of different lengths, the $MgF_2$ crystal has birefringence. As has been described in the section of the solving means for preventing the laser from deteriorating in the degree of linear polarization due to birefringence, there are provided two chamber windows, the first chamber window 2 and second chamber window 3. As shown in FIGS. 23A and 23B, the two chamber windows are attached with the orientation of their c-axis (optic axis) at the same angle when viewed from inside the chamber (see the arrows A and B in FIG. 22). In terms of a single path, the angles of crystal orientation with respect to the single-path optical axis L are (−θ, +θ). Such an attachment can cancel a change in phase difference.

To determine the angles, an X-ray diffraction analysis is preferably performed to measure the crystal orientation of the c-axis in advance. The windows may be marked for the c-axis direction on the side, so that the windows can be rotated by the angle θ° according to the marks for efficient attachment.

The reference example has dealt with the case where the c-axis is perpendicular (90°) to the normal of the windows. However, the windows may be fabricated so that the angle τ formed between the c-axis and the normal of the windows falls within the range of 0°<τ<90°. In such a case, the two chamber windows are formed with the same angle r, and arranged at installation angles of θ° and −θ°, respectively.

The same effect is obtained with a single chamber laser, as well as MOPO type (injection lock), MOPA type (amplifier stage), and ring amplification type lasers.

The gas discharge chamber according to the present invention is applicable to a PO laser chamber in a MOPO system, a PA laser chamber in a MOPA system, and a single laser chamber.

The foregoing description has dealt with the cases where the two chamber windows are attached to tilt in parallel as shown in FIGS. 24 and 25A to 25C. In such a case, the relationship of (−θ, +θ) holds in terms of a single path when the crystals are rotated in the same direction by the same angle (for example, +θ) about the <111> axis when viewed from inside the chamber. Unlike such an arrangement, the two chamber windows may be arranged as shown in FIGS. 26 and 27A to 27C where the windows tilt in opposite directions (inverted-V configuration). Even in such a case, the windows can be brought into the relationship of (−θ, +θ) in terms of a single path by rotating the crystals in the same direction by the same angle (for example, +θ) about the <111> axis when viewed from inside the chamber.

Up to this point, the gas discharge chamber according to the present invention has been described in conjunction with the embodiments thereof. The present invention is not limited to such embodiments, and various modifications may be made thereto.

The first window and the second window mounted on the gas discharge chamber are made of birefringent crystals. The crystals of the first window and the second window are arranged with respect to the laser optical axis so that the laser light of the first polarization state incident on the first window is transmitted through the first window and passes through the excited laser gas in the second polarization state, and the laser light of the second polarization state is transmitted through the second window and generally returns to the first polarization state. Such a configuration makes it possible to suppress a drop in the degree of linear polarization despite the transmission or reciprocation of the laser light through the gas discharge chamber.

What is claimed is:

1. A gas discharge chamber comprising:
a chamber;
a laser gas that is sealed in the chamber;
means for exciting the laser gas; and
a first window that is mounted on the chamber and through which light occurring from the excited laser gas is emitted outside the chamber,
the first window being arranged along an optical axis,
the first window having an incident plane and an emitting plane in parallel with a (111) crystal plane of its calcium fluoride crystal,
with respect to an arrangement such that laser light entering the calcium fluoride crystal lies within a plane including a <111> axis and a <001> axis of the first window as seen from inside the chamber, the first window being arranged in a position rotated about 60 degrees about its <111> axis.

* * * * *